(12) United States Patent
Stechmann (10) Patent No.: US 9,577,417 B2
(45) Date of Patent: *Feb. 21, 2017

(54) CABLE MOUNTING BRACKET APPARATUS AND SYSTEM

(71) Applicant: Eric Stechmann, Liberty, MO (US)

(72) Inventor: Eric Stechmann, Liberty, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/009,398

(22) Filed: Jan. 28, 2016

(65) Prior Publication Data

US 2016/0149386 A1 May 26, 2016

Related U.S. Application Data

(63) Continuation-in-part of application No. 14/252,629, filed on Apr. 14, 2014, now Pat. No. 9,252,581.

(60) Provisional application No. 61/811,424, filed on Apr. 12, 2013.

(51) Int. Cl.
| | | |
|---|---|---|
| *F16L 3/00* | (2006.01) | |
| *H02G 3/32* | (2006.01) | |
| *F16B 1/00* | (2006.01) | |
| *H02G 3/30* | (2006.01) | |

(52) U.S. Cl.
CPC ........... *H02G 3/32* (2013.01); *F16B 1/00* (2013.01); *F16B 2001/0035* (2013.01); *F16L 3/00* (2013.01); *H02G 3/305* (2013.01)

(58) Field of Classification Search
CPC ............. H02G 3/305; F16L 3/00; F16B 1/00; F16B 2001/0035
USPC ............. 248/62, 65, 71, 73, 206.5, 74.1
See application file for complete search history.

(56) References Cited

U.S. PATENT DOCUMENTS

| | | | | |
|---|---|---|---|---|
| 4,907,769 A | * | 3/1990 | Hunley, Jr. | ............. F21V 21/06 248/122.1 |
| 5,623,801 A | | 4/1997 | Drumbl | |
| 5,699,910 A | * | 12/1997 | Kubat | ............. B25H 5/00 206/373 |
| 6,622,976 B1 | * | 9/2003 | Ianello | ............. F16L 3/13 248/71 |
| 7,354,360 B1 | | 4/2008 | Eckstein | |
| 7,624,957 B2 | | 12/2009 | Klein | |
| 8,235,235 B1 | | 8/2012 | Lusch | |
| 8,413,734 B2 | | 4/2013 | Silcox et al. | |
| 8,439,316 B2 | * | 5/2013 | Feige | ............. F16L 3/13 248/71 |
| 8,523,120 B2 | | 9/2013 | Asano et al. | |
| 9,188,276 B2 | | 11/2015 | Klein | |

* cited by examiner

*Primary Examiner* — Gwendolyn Baxter
(74) *Attorney, Agent, or Firm* — Lathrop & Gage L.L.P.

(57) ABSTRACT

A bracket and a cable mounting system which includes a bracket with a center panel or channel and with magnetic pads located on the distal ends of the center panel or channel so that the bracket may be attached to a structure by magnetic attraction. The cable mounting system may also consist of two brackets set a distance apart and a support rail placed in between and coupled to the brackets.

14 Claims, 11 Drawing Sheets

CABLE MOUNTING BRACKET APPARATUS AND SYSTEM

RELATED APPLICATION

This application is a continuation in part application to U.S. application Ser. No. 14/252,629 filed on Apr. 14, 2014, which claims priority to U.S. Provisional Application No. 61/811,424 filed Apr. 12, 2013, the disclosures of which are incorporated herein by reference.

FIELD OF THE INVENTION

This disclosure relates to brackets and mounting systems. More specifically, this disclosure concerns brackets and mounting systems used in elevated locations that are exposed to the outdoor and immersive areas.

BACKGROUND OF THE INVENTION

Historically, equipment from communication and electrical installations including; coaxial cables, conduit, wires, and other components which vertically traverse elevated structures have been fastened directly to worker access structures including; ladders, ladder cages, and hand rails. These structures have provided an immediate solution for equipment fastening. However, this type of installation has historically presented unsafe working conditions for the workers by obstructing and encumbering movement and rescue throughout access areas. Additionally, these installations may cause maintenance and/or structural damage when installed on areas which lack initial design and structural capability. Aside from fastening communication devices onto the aforementioned areas, a traditionally more acceptable installation includes welding or banding of communication brackets and raceways along the length of vertical steel. Many of these installations, however, have historically been of high cost and are associated with additional safety, structural, and maintenance issues.

The United States Occupational Safety and Health Administration's (OSHA) current regulations stipulate against specific obstructive encumbrances upon or within worker or rescuer access areas. Other national U.S. and state agencies also provide regulatory and design stipulations further prohibiting obstructions into and within these areas. More specifically, traditional fastening of communication and electrical equipment onto areas such as ladders encumber the fluid motion of the workers' hands when grasping and transitioning along the side-rails. Fastening devices such as clamps and bolted connections commonly encumber foot placement on rungs and further create abrasion risks for the worker or rescuer. Many coaxial cables used in the telecommunication industry emit radio-frequency waves. When workers and rescuers are subjected to these close-proximity coaxial cable installations they face exposure to radio-frequency waves which are known to cause bodily harm.

Elevated steel structures and associated access structures are commonly coated with expensive corrosion resistant high performance materials in order to limit corrosion through environmental exposure to the steel. Many of these materials need to be maintained according to industry standards derived from the Society for Protective Coatings, the National Association of Corrosion Engineers, and the American Water Works Association. When scheduled for routine maintenance and renovation work, many of the aforementioned traditional fastening methods are difficult to temporarily move off of or away from the steel. In some cases coordination of a temporary removal of the communication equipment may allow for a non-obstructed steel structure during its time of maintenance. Many of these cables and antennae are temporarily re-erected onto a Cell-On-Wheels (C.O.W.) which is usually an expensive and logistically difficult scenario. Due to the cost of the telecommunication equipment and ownership, many steel structure maintenance providers are prohibited from removing or repositioning such equipment. It is common for this telecommunication equipment to remain fastened to the coated steel surface, presenting a surface preparation and coating obstruction. This, in turn, causes the obstructed steel areas to not receive the proper corrosion repair and application of coatings. Furthermore, many installations induce abrasion and corrosion to the steel structure through cyclic abrasive action between coatings and fastening connections and by increasing the moisture content below and adjacent to the fastening area.

A traditional method of fastening communications equipment away from access areas includes weld-fastening coated steel stand-off brackets in series along the structural steel body. The cables can then be secured to these firmly welded "stand-off" brackets. Welding steel brackets onto the structure, especially an existing structure, is usually expensive, time intensive, requires specialized equipment and certification. In the case of weld-fasting onto a coated steel structures, the installation procedure must include abrasive removal of the coatings and steel in the areas of welding. This creates a breach in the homogenous corrosion resistance application to the steel which may cause accelerated corrosion if left improperly repair coated. Additionally, high temperatures induced from welding and grinding typically cause burning of the coatings near the site of the weld and obverse to the steel weld area. Proper repair of these areas include grinding of all affected areas to fresh steel and re-application of one or multiple coating layers which must also be matched for color and chemical compatibility. Traditionally, the obverse side of many of these installations are left inadequately or completely devoid of proper repair.

Steel surfaces to which fastening must be accomplished between communication equipment and the steel surfaces vary greatly according to radii and angled corners. While welded "stand-off" brackets come in a variety of shapes and sizes, they are not specifically designed to tangentially surface match with these curves and angles of the underlying steel structure. Thus, these existing one-size-fits-all brackets do not maximize the surficial contact areas in order to provide the maximum amount application stability. Previous designs also create sharp contact areas which regularly cause sharp abrasion pinch-points to underlying coatings. Additionally, these installations are not low-profile when compared to the steel surface, creating obstructions within the cross-section of access areas. This existing high-profile issue causes a top-heavy high profile connection which may structurally fail when induced to seasonal external environmental forces such as wind and ice dynamic loading characteristic of elevated structures.

SUMMARY OF THE INVENTION

The present disclosed technology consists of a bracket, as well as an improved mounting system for securing components to an elevated steel structure. The bracket has at least two legs which are angled or pivot in order to tangentially match the radius or angle of the structure to which the bracket is applied. This allows for increased surficial contact area between the distal end of the leg and the structure.

Additionally, the bracket has a center connecting member into which exists at least one hole which receives industry standard "snap-in" cable fasteners, bolts, and other fastening devices. In one embodiment, the bracket has two sets of two legs detachably connected to the center connecting member and at least one hole in each distal end of the leg by which it may be attached to a structure by a screw, bolt, or other fastening device.

In a second embodiment, the bracket has at least two angled legs and at least one magnetic pad attached to each distal end of each leg of the structure. The magnetic pad is comprised of a magnet firmly embedded into a corresponding socket. The magnet is solidly fixed in the steel socket, and the bracket can then be magnetically secured to a structure comprising a ferrous material through magnetic force. Tangential magnet surface to steel surface is optimized.

In a third embodiment, the bracket has a low aspect ratio. This provides for a more stable bracket against exposure to the external forces common to elevated structures. In a fourth embodiment, the bracket has at least one hole in each of the at least two legs for the purpose of securing a cable using cable clamps, bolts, or other fastening devices.

The brackets may also be inter-connected to one another along their traverse though connecting a series of rigid rails onto one or more fastening locations along the structure of the bracket.

DEFINITIONS

As used herein the following terms have the following meanings:

The term "distal end" shall mean the end of the bracket leg that is most distant from the center connecting member, channel or panel of the bracket.

The term "aspect ratio" refers to the ratio of the height of the bracket when placed on a flat surface in relation to the distance from one distal end of a leg to the distal end of a leg on the opposite side of the bracket. For example, a bracket that measures 14 inches from distal end to distal end and that has a height of 4 inches from the center connecting member to a flat surface would have an aspect ratio of 4:14, or 28.6%.

The term "radius of curvature" shall mean the radius of a circle that best fits the curve at that point on the structure.

The term "angle of departure" shall mean the angle of incline or decline from which the leg members of a bracket extends away from the center panel, center connecting member or channel member of the bracket.

DETAILED DESCRIPTION

The disclosed technology is directed to a bracket that is curved so that the curvature of the distal end of the legs is matched to the tangential radius or angle of the structure, such as a water tower, that the bracket will be secured to. The surface of the structure can be concave, convex, or form any number of angles. The bracket has at least one hole in the center connecting member, at least two legs that detachably connect and extend outwardly and downwardly from the center connecting member, and a distal end at each of the legs where the curvature of the legs is matched to the curvature of the structure to which the bracket is applied.

According to OSHA regulations at 29 CFR 1910.27(d)(1)(vi), ladders are to have a clear width of at least 15 inches measured each way from the centerline of the ladder. Smooth-walled wells shall be a minimum of 27 inches from the centerline of rungs to the well wall on the climbing side of the ladder. Where other obstructions on the climbing side of the ladder exist, there shall be a minimum of 30 inches from the centerline of the rungs. According to the OSHA regulations at 29 CFR 1910.27(c)(4), the distance from the centerline of rungs, cleats, or steps to the nearest permanent object in back of the ladder shall be not less than 7 inches, except that when unavoidable obstructions are encountered. It is these federal regulations that limit the use of ladders for purposes of securing cable traverses and facilitate the use of the disclosed technology that can be secured to the structure proximate the ladder but sufficiently far away to avoid noncompliance with the federal regulations.

Figure 1:
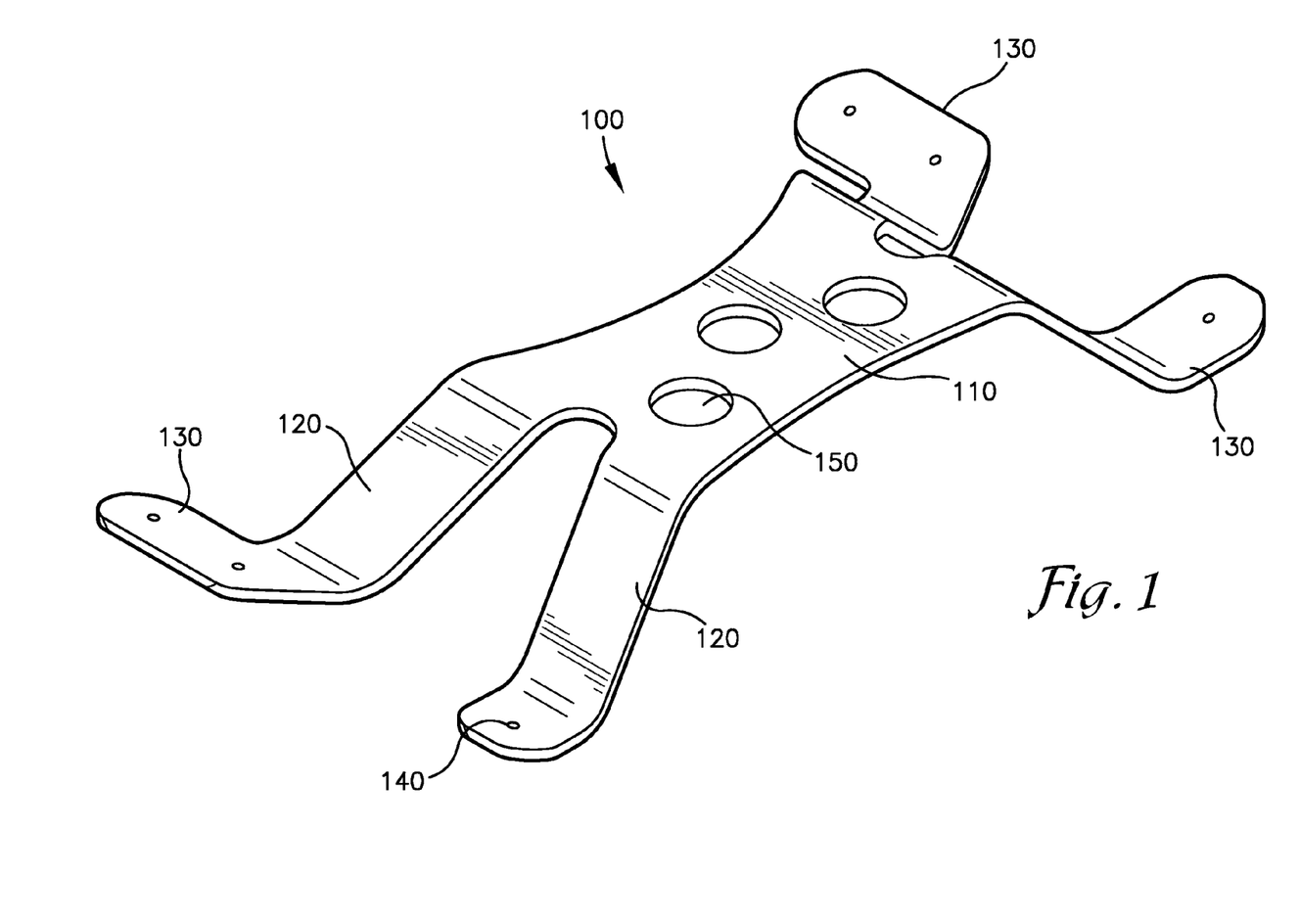
FIG. 1 is a perspective view of an embodiment of the bracket.

As shown in FIG. 1, a first embodiment of the bracket 100 disclosed herein is comprised of a center connecting member 110 detachably connected to two sets of two legs 120. The distal end of each leg 130 contains at least one hole 140 through which a fastening device may be passed through and the bracket 100 may be adhered to a structure. The bracket 100 is preferably fabricated from a 10 gauge stainless steel alloy, such as austenitic 304 stainless steel. 304 stainless steel is composed of a minimum of 18% chromium and 8% nickel, combined with a maximum of 0.08% carbon. The legs 120 extend outwardly and downwardly to create a bracket with a wide stance and a low aspect ratio. The hole in the center connecting member 150 has a diameter preferably in the range of 0.10 to 1.25 inches in order to facilitate engagement with industry standard "snap-in" cable clamps, bolts, flexible fasteners such as zip ties, or other fastening devices to secure components.

Because the curvature of the distal ends of the legs of the bracket are closely matched to the radius of curvature of the structure a high percentage of the designated surface of the legs of the bracket are in contact with the surface of the structure. Specifically, a designated portion of the legs are intended to engage the surface of the structure and maximizing that surface contact which creates a more optimal fastening. The surficial contact between the designated portion of the leg typically ranges between 50 and 100% and therefore improves the capacity of the bracket to withstand forces seeking to separate the bracket, i.e., wind shear and ice loading, from the building. Alternatively, the legs of a bracket may engage the surface of the structure along a tangential line of contact if the surface of the structure is highly curved and thereby limits the scope of surficial contact.

Figure 2:
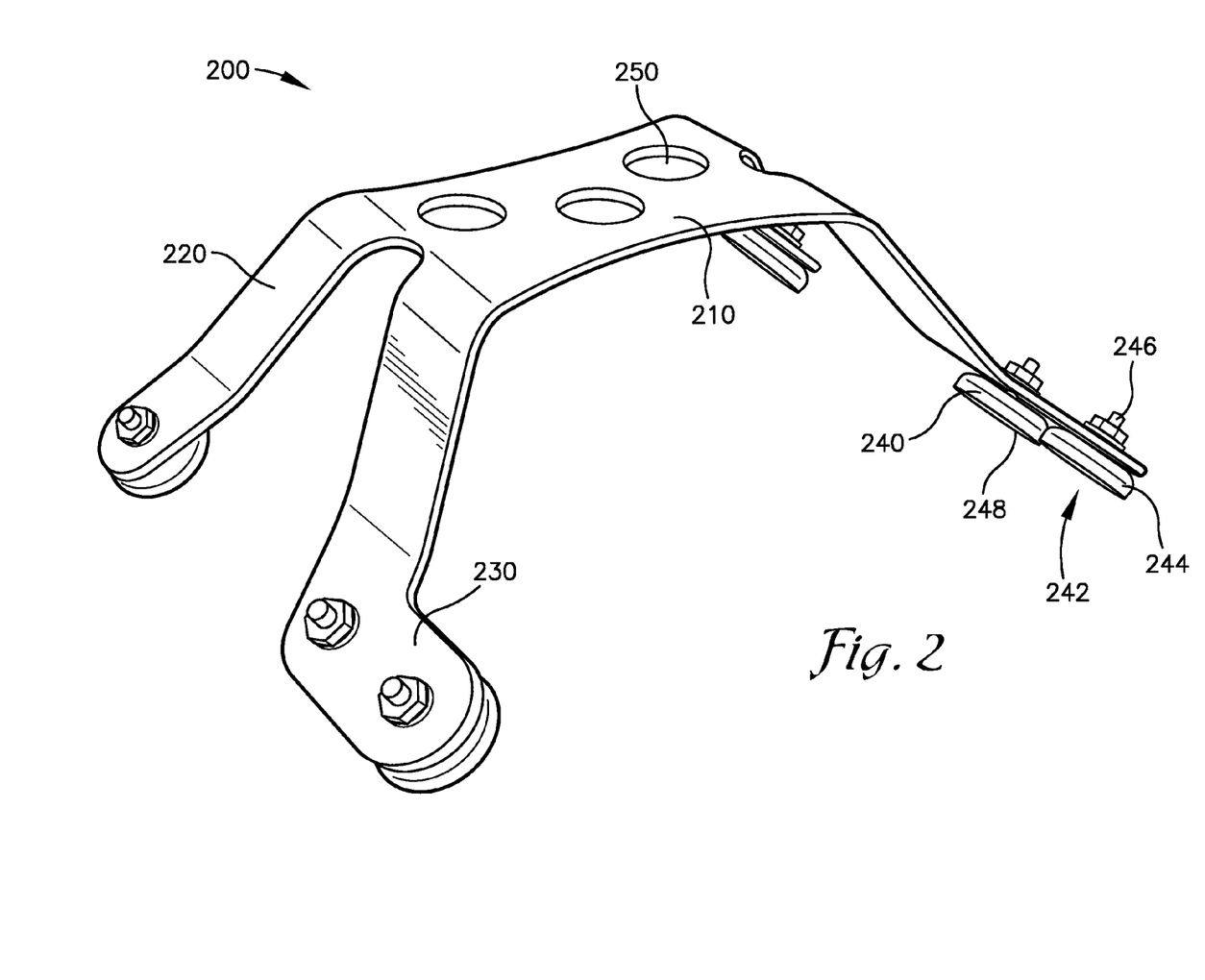
FIG. 2 is a perspective view of an embodiment of the bracket with magnetic pads attached at the distal end of the legs.

As shown in FIG. 2, a second embodiment of the bracket 200 disclosed herein is comprised of a center connecting member 210, four legs 220, at least one hole in the center connecting member 250, and at least one magnetic pad 240 attached to the distal end of each leg 230.

One embodiment of the magnetic pad 240 is comprised of a rare-Earth alloy magnet 242 and corrosion resistant steel socket 244 with a corrosion resistant stem 246. Rare-Earth magnets generally have the greatest magnetic field strength per weight ratio of permanent magnets currently and commonly available. The magnetic pads 240 are attached to the distal end of each leg 230 of the bracket 200 either by threading the stem 246 or by pushing the stem 246 through the structure of the bracket and subsequently securing the magnet assembly with a combination of rivet or locking washer, locking nut and/or chemical locking compound so that the magnetic pads 240 are solidly fixed. The steel socket 244 encases the magnet 242 and tends to magnetically focus the magnetic field into the ferrous surface to which the bracket 200 is attached. In operation, the rim of the socket 248 as well as the magnet 242 itself contacts the structure creating a broader surface area contact providing additional mitigation against sheer force. A magnet's pull force is based on many considerations, such as the diameter and thickness of the magnet, the grade of the magnet, and the distance the magnet is from a ferrous material. The magnets utilized in the disclosed technology may individually have a pull force of 60-120 lbs when connected closely and tangentially to a ferrous steel structure of substantial steel thickness.

For additional strength and support, the surface area of magnetic pads 240 and the points of contact are spread to the distal end of each of the four legs 230. Multiple magnetic pads 240 may be affixed to the distal end of each of the four legs 230 to increase the resistive sheer, moment, and vertical pull forces imposed onto the affixed bracket.

The bracket 200 with magnetic pads 240 is readily adjustable or removable. The bracket 200 can be applied in a variety of weather condition and temperatures. Additionally, the bracket 200 is hand attachable and hand removable, though tool application may be used.

Figure 3:
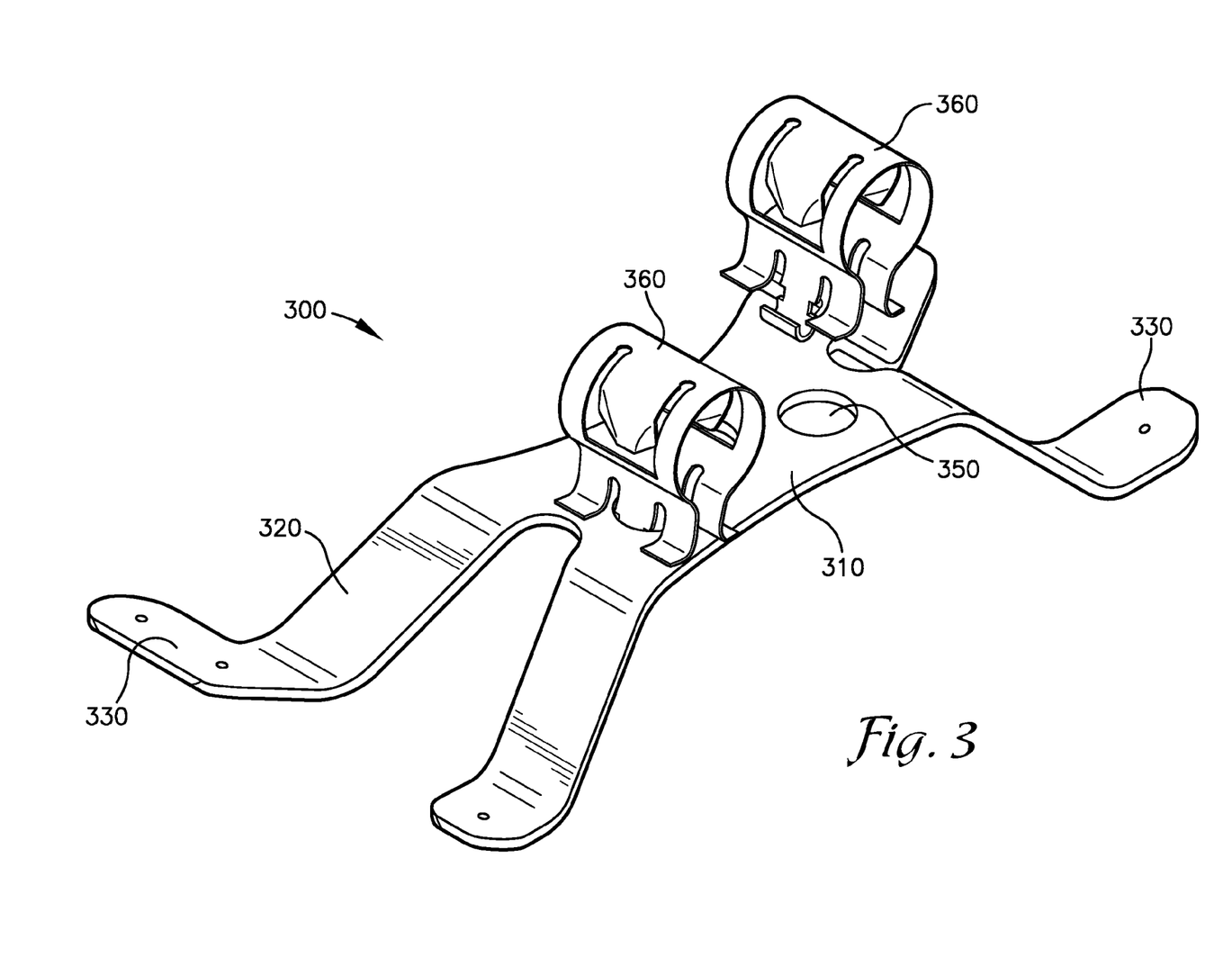
FIG. 3 is a perspective view of an embodiment of the bracket utilizing a clamp embodiment for attaching components to the bracket.

As seen in FIG. 3, a preferred embodiment of bracket 300 disclosed herein has an aspect ratio of between 15% and 75%. An optimum open gap exists between the center connecting member 310 of the bracket 300 and the underlying structure. This improves aesthetics and maintenance operations. Four detachable legs 320 extend outwardly and downwardly from the center connecting member 310 to create a wide stance and allow the bracket to maintain a low profile. This wide stance also increases the moment force stability of the bracket. If magnetic pads (see FIG. 2, 240) are affixed to the distal end of the legs 330, the wide stance compliments the holding force of the magnets by lowering the center of gravity of the bracket and thus reducing the length of the moment arm. The hole in the center connecting member 350 may be between 0.10 and 1.25 inches in diameter to receive industry standard "snap-in" cable clamps 360.

The low aspect ratio exhibited on bracket 300 mitigates several forces by reducing the bracket's structural moment arm. Reduction in both static forces from sheer weight of the cabling system and also from dynamic forces induced from wind and other cyclic forces combine in improving the reliability of the fastening security to the structure. Elevated structures are exposed to unique external forces, such as high wind speeds and wind-driven precipitation which can apply substantial loads to the cable bracketing system.

Additionally, the bracket 300 may be utilized where components extend horizontally across a structure, such as a bridge, as well as where components traverse elevated structures.

In some embodiments, cable "snap-in" fasteners may have an opening in a center connecting member at the top of the fastener, wherein another cable fastener may be received into the top of the underlying "snap-in" cable fastener. The brackets may be sized and built to accommodate this increase in load forces. The cable clamps 360 can accommodate hard installations such as rigid conduit or flexible conduit or cables. Additionally, the cable clamps may be installed manually or with a tool application.

Figure 4:
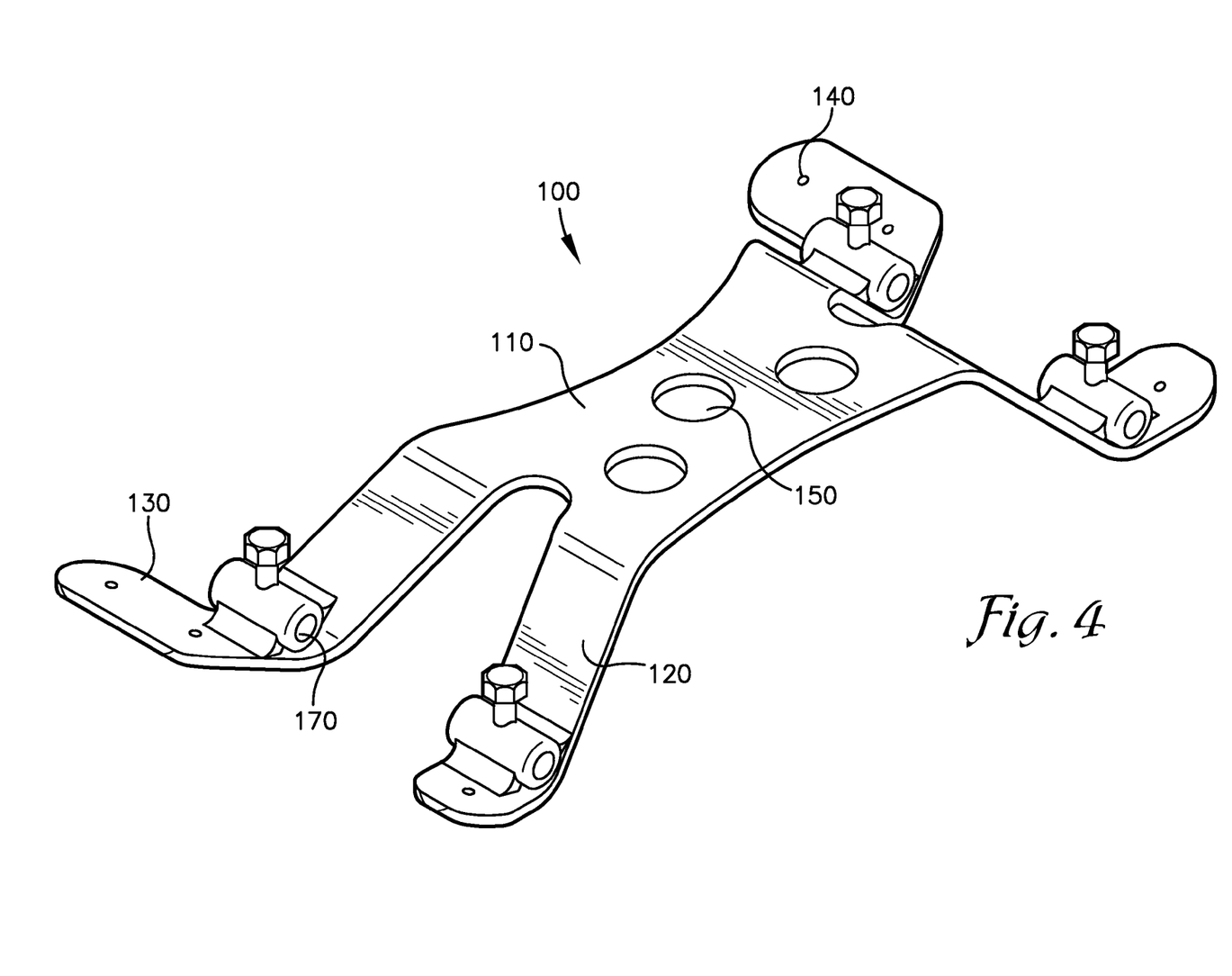
FIG. 4 is a perspective view of an embodiment of the bracket with support rail coupling members.

Individual brackets can be further strengthened and transformed into an interconnected cable bracketing system by utilizing rigid support rails to attach multiple brackets in series. In FIG. 4, the embodiment of the bracket 100 disclosed herein, and as shown in FIG. 1, is shown in perspective view with support rail coupling members 170 attached to the bracket 100 between the distal end of the leg 130 and the leg 120.

Figure 5:
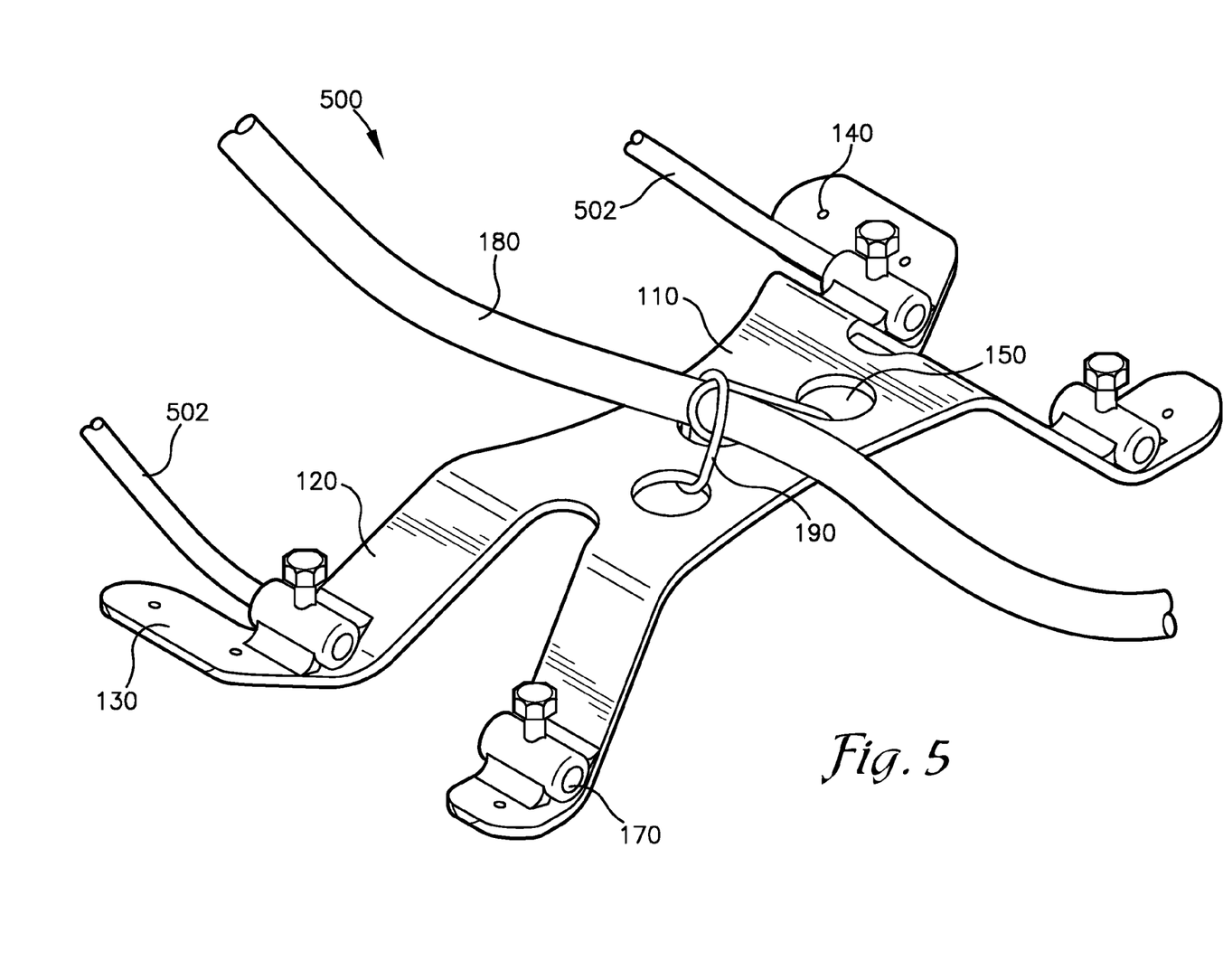
FIG. 5 is a perspective view of an embodiment of the bracket depicting a cable secured to the bracket.

In FIG. 5, an embodiment of the cable mounting system 500 is shown as it pertains to one bracket 100. The support rails 502 are secured to the bracket 100 by support rail coupling members 170, which are attached to the bracket 100 between the distal end of each leg 130 and the leg 120 of the bracket 100. A cable 180 is attached to the bracket 100 by fastening devices 190 attached to the bracket by utilizing the holes 150 in the center connecting member 110.

Figure 6:
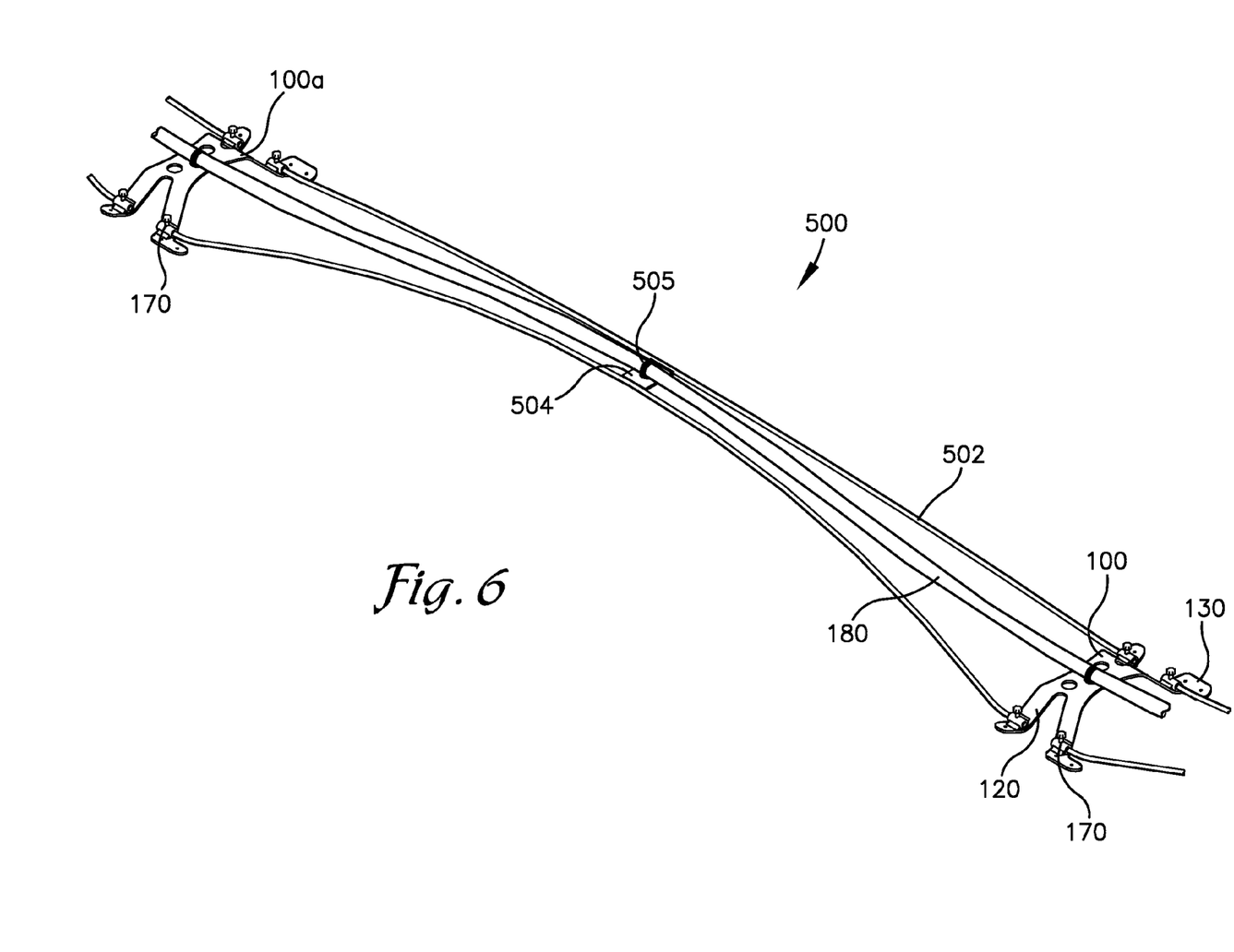
FIG. 6 is an embodiment of the cable mounting system.
Figure 7:
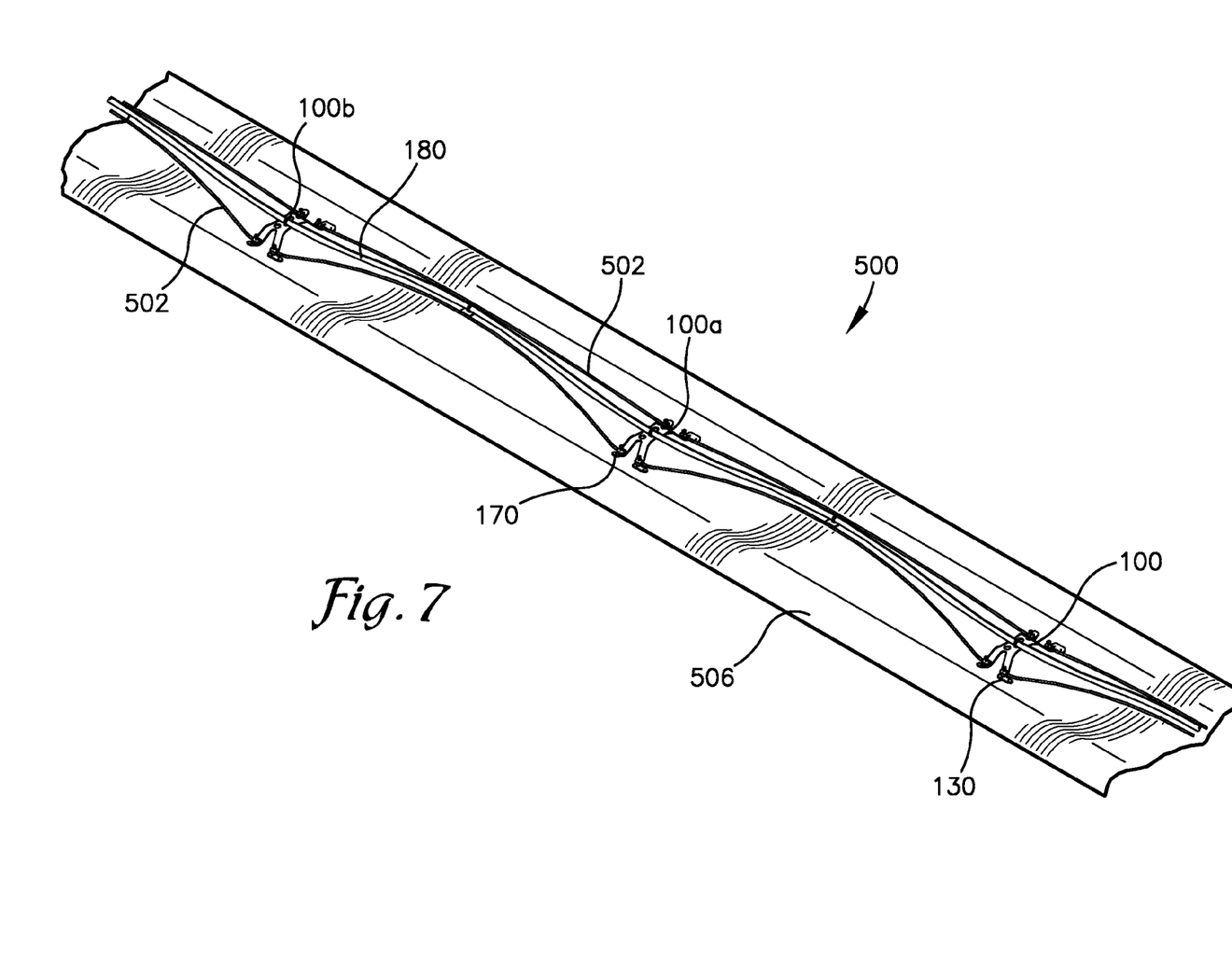
FIG. 7 is an embodiment of the cable mounting system employing support rails.

As shown in FIG. 6, an embodiment of the cable mounting system 500 is depicted as it applies to two brackets. The support rails 502 are secured to the bracket 100 through support rail coupling members 170. A cable 180 is attached to the bracket 100. The support rails 502 arc away from the structure to which the bracket 100 is attached and converge at the middle of the support rail 502 to attach to a support rail platform 504. The cable 180 is attached to the support rail platform 504 by a fastening device 505 for the purpose of securing the cable 180. The fastening device 505 could be a cable clamp, bolt, flexible fasteners such as zip ties, or other fastening device used to secure components. The support rail platform 504 provides cable stability and prevents the cables 180 from flailing under wind loads. The support rails 502 then arc back towards the structure and secure at the support rail coupling members 170 on the next bracket 100a. As shown in FIG. 7, this cable mounting system 500 can continue for the entire traverse of the structure 506 to which the brackets 100, 100a, and 100b are attached.

The system 500, like the brackets 100, also has low aspect ratio to decrease the moment arm and increase the likelihood of the brackets 100 staying secured to the structure 506 when external forces are applied to the individual brackets 100 and the cable mounting system 500. Interconnecting the brackets can create improved electrical grounding capability.

The cable mounting system 500 further helps to keep the cables 180 away from the structure's surface 506. Doing so provides several benefits such as reducing cyclic flexing of the cables. This reduces the likelihood of internal failure of the cable from cyclic internal stresses and also reduces contact abrasion between the cables and the underlying surface. This also facilitates the maintenance of the high performance coating materials used on many elevated steel structures. The distal end of the leg 130 may also be coated with a high performance corrosion resistant material.

Figure 8:
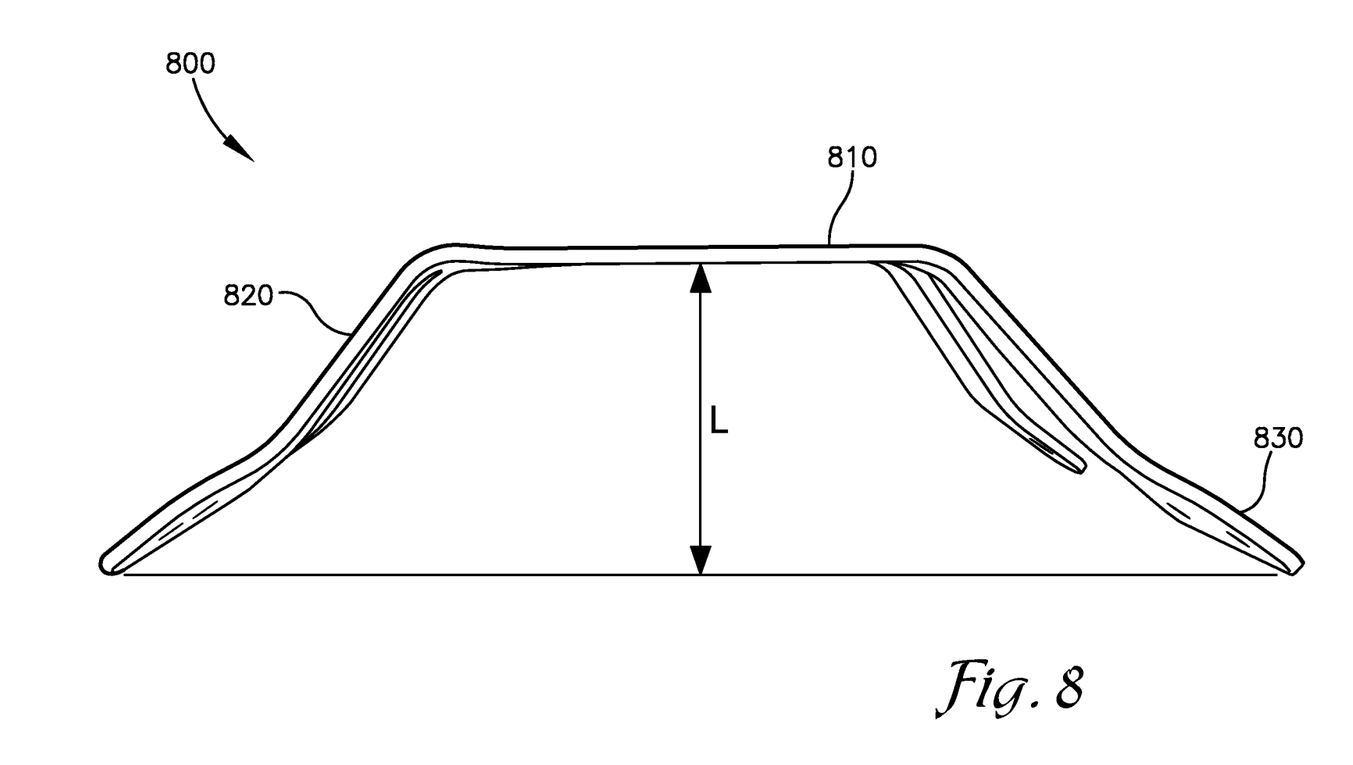
FIG. 8 is a perspective view of an embodiment of the bracket depicting the aspect ratio.

As seen in FIG. 8, an embodiment of the bracket 800 disclosed herein has a low aspect ratio. The aspect ratio is determined by the distance between the two distal ends of the leg 830 and the distance L, or the moment arm, between a surface and the center connecting member 810 of the bracket 800. This aspect ratio is between 10% and 75%. The distance L can be decreased by further extending the legs 820 and distal end of the legs 830. In FIG. 8, the bracket 800 is depicted as resting on a flat surface. In another embodiment, the surface may be curved to match the curvature of the distal end of the legs 830. This would further decrease the distance L between the center connecting member 810 and the steel surface.

Figure 9:
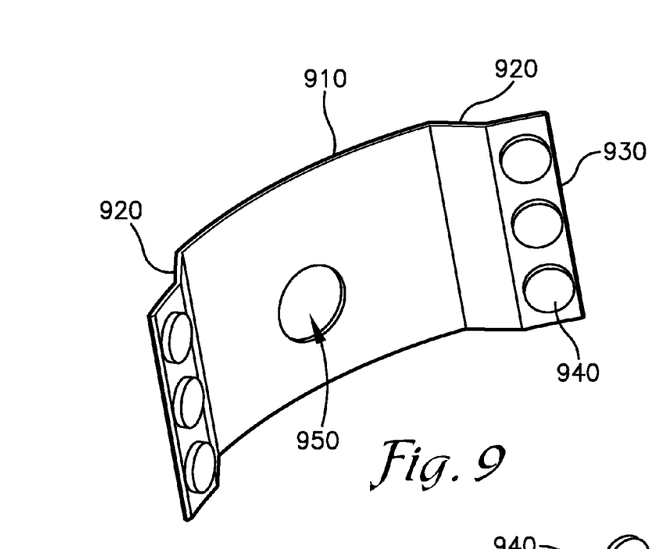
FIG. 9 is a perspective view of an embodiment of a bracket.
Figure 10:
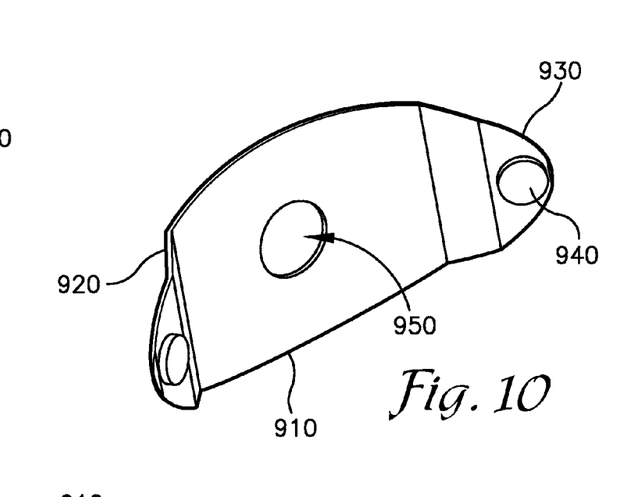
FIG. 10 is a perspective view of an embodiment of a bracket.
Figure 11:
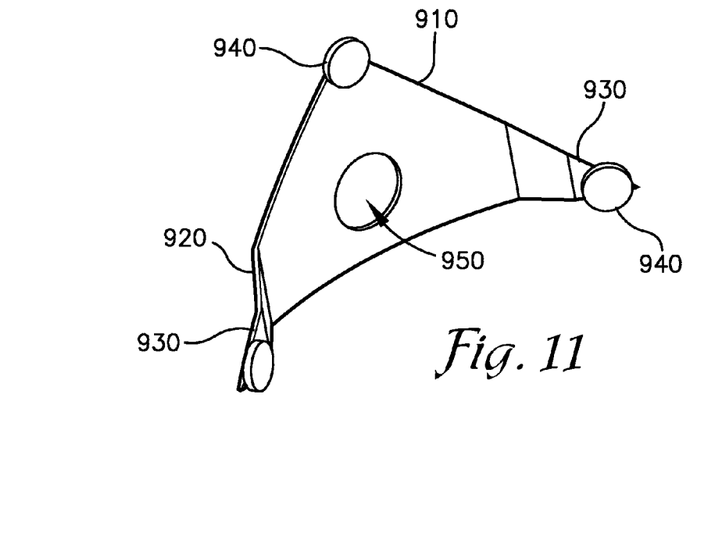
FIG. 11 is a perspective view of an embodiment of a bracket.

FIG. 9 is an alternative embodiment of the bracket 900 comprised of a center connecting member 910, two legs 920 that extend outwardly and downwardly from the center connecting member 910, magnetic pads 940 attached to the distal end of the legs 930, and a hole in the center connecting member 950. The hole in the center connecting member has a diameter in the range of 0.25 to 0.85 inches. FIG. 10 is an alternative embodiment of the bracket 900 comprised of a center connecting member 910, two legs 920 that extend outwardly and downwardly from the center connecting member 910, magnetic pads 940 attached to the distal end of the legs 930, and a hole in the center connecting member 950. In one embodiment the bracket 900 is oval-shaped. FIG. 11 is an alternative embodiment of the bracket 900 comprised of a center connecting member 910, two legs 920 that extend outwardly and downwardly from the center connecting member 910, magnetic pads 940 attached to the distal end of the legs 930, and a hole in the center connecting member 950. In this embodiment the bracket 900 is triangular. Additionally, there is a magnetic pad 940 attached where the triangle comes to a point in the center connecting member 910.

Figures 12, 13:
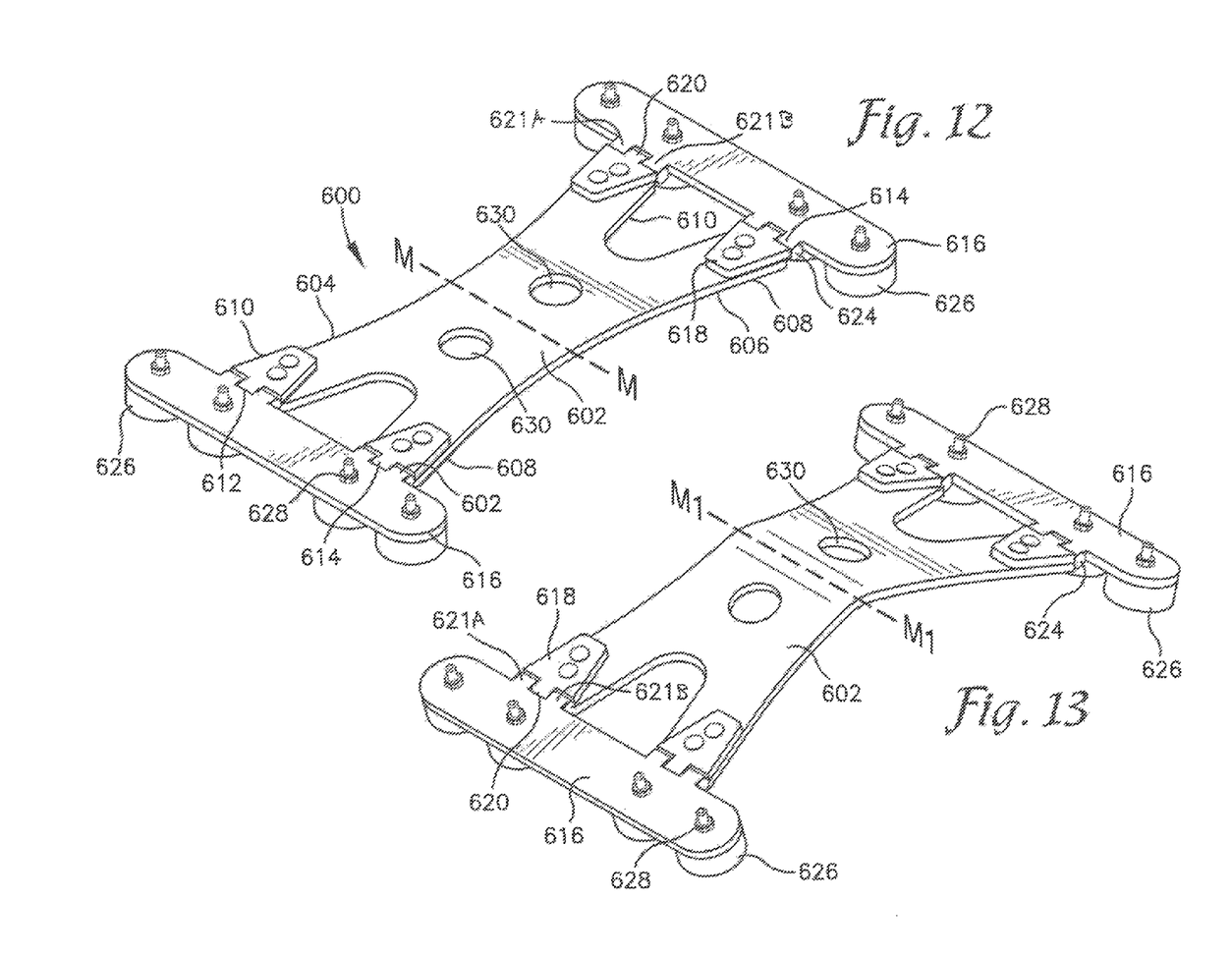
FIG. 12 is a perspective view of an embodiment of a bracket.
FIG. 13 is a perspective view of an embodiment of a bracket.

FIG. 12 is yet another embodiment of the bracket 600 that utilizes a center panel 602 with first and second ends 604, 606. In the embodiment depicted in FIG. 12 two leg elements 608, 610 extend outwardly from each of the first and second ends 604, 606 of the center panel 602. A single leg element or two, or more, leg elements extending outwardly from the center panel 602 are contemplated with this design. At the distal end of each of the leg elements 608, 610 is a hinge 612, 614 that facilitates rotation of a mounting member 616 to each of the leg elements 608, 610. The hinge 612, 614 utilizes an upper plate, or leaf 618, secured to the leg elements 608, 610. The upper plate 618 further comprises at least one knuckle 620. The upper plate knuckle 620 is disposed between adjacent knuckles 621A, 621B of the mounting member 616. A pin 624 passes through the knuckles 620, 621A, 621B forming the hinge 612, 614 and facilitates rotation of the mounting member 616 about the leg elements 608, 610. The hinges 612, 614 accommodate at least a 180 degree rotation of the mounting member 616 about the leg elements 608, 610.

The mounting member 616 further includes at least one magnetic pad 626 attached thereto preferably with a riveted or threaded fastener 628. To increase the holding power of the bracket 600 to the structure a plurality of magnetic pads 626 may be secured to the mounting member 616 spread across the length of the mounting member 616. Because the mounting member 616 is secured with a hinge 612, 614 to the leg elements 608, 610 the mounting member 616 may assume an infinite number of angular orientations to maximize the surficial contact between the surface of magnetic pad 626 and the surface of the structure thereby maximizing the holding power of the magnetic pads and of the bracket 600 to the structure. The adjustability of the angular orientation of the mounting member 616, and in turn the magnetic pads 626, enhances the ability of the brackets 600 to hold tightly to the surface of a curved structure.

As discussed above, FIG. 12 reveals a bracket embodiment wherein the center panel 602 is substantially flat. A mid-line M-M is detailed in FIG. 12 equidistant between two through holes 630 that effectively separates the bracket 600 into two portions that are mirror images of one another. The bracket depicted in FIG. 13 also includes a mid-line M1-M1 that denotes the location of a bend in the center panel 602. The bend at the mid-line M1-M1 further facilitates the capacity of the bracket 600 to accommodate attachment to the surface of curved structures. The range of the bend about the mid-line M1-M1 can vary between near zero degrees to 45 degrees in order to accommodate varying surface configurations. The through holes 630 of the center panel 602 are utilized for securing components to the bracket wherein the components are typically, but not exclusively, conduits and cables.

Figure 14:
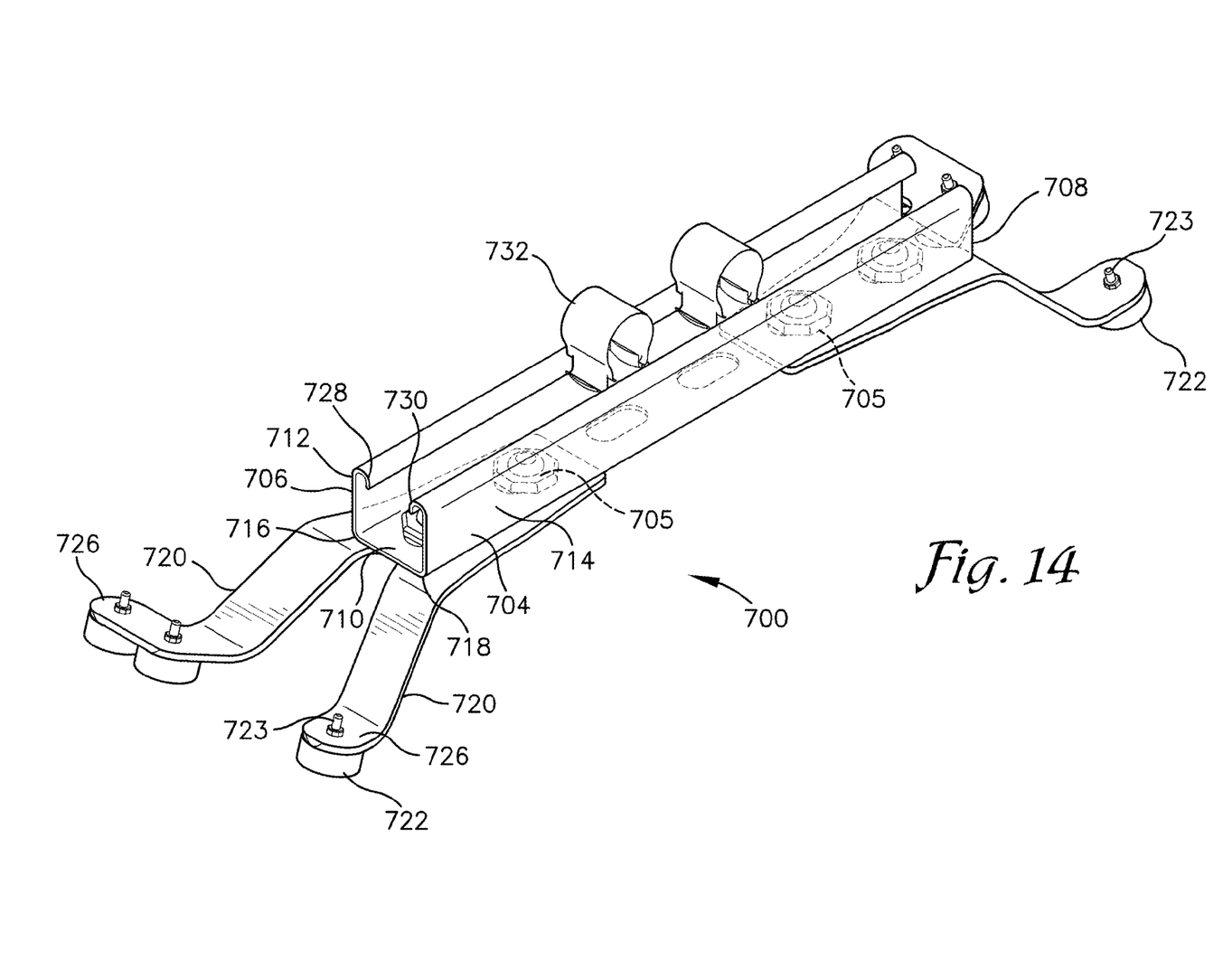
FIG. 14 is a perspective view of an embodiment of a bracket.

FIG. 14 reveals yet another embodiment of the bracket 700 for securing components to a surface of a structure. The bracket 700 comprises a channel member 704 further comprising first and second longitudinally opposed ends 706, 708 a floor 710 and opposed side walls 712, 714 separated by the floor 710. The union of the floor 710 and walls 712, 714 occurs at the corners 716, 718 of the channel member 704. The bracket 700 further comprises at least one leg element 720 outwardly extending from the channel member 704 and detachably secured with fasteners 705 to the channel member floor 710 and proximate to each of the first and second ends 706, 708 of the channel member, wherein the angle of departure of the at least one leg element 720 extending outwardly from the channel member is determined by, and customized to match the radius of curvature of the surface of the structure to which the bracket is to be attached. In addition, at least one magnetic element 722 is detachably secured with a fastener 723 to the leg elements 720, wherein the magnetic element 722 maintains maximum surficial contact with the surface of the structure due to the precision matching, during fabrication, of the angle of departure of the leg elements 720 with the surface of the structure. In the embodiment depicted in FIG. 14, the leg elements 720 include an outwardly extending step segment 726 through which the magnetic elements 722 are secured. It is the step segment 726 angle relative to the leg elements 720 as well as the angle of the leg elements relative to the channel member 704 that during fabrication are matched with the radius of curvature or other unique configuration of the surface of the structure.

FIG. 14 further reveals that the channel member side walls 712, 714 further comprise upper wall edges 728, 730 opposite the corners 716, 718. The upper wall edges 728, 730 are arcuately bent downward to facilitate engagement with clips 732 for securing components, such as conduits and cables, to the bracket 700. The floor 710 of the channel member has through holes 730 for securing the leg elements 720 and other components as needed.

The various embodiments of the brackets detailed above provide a wide range of options for safely and quickly securing cabling and conduits to the exterior and interior surfaces of structures such as water towers. With some of the above detailed embodiments, the bracket legs are custom fabricated to match the radius of curvature of the structure in order to maximize the tangential surficial contact between the magnetic elements and the attachment surface. In other embodiments the magnetic elements are, for example, hinged and capable of readily aligning with the tangential surface of the structure.

Although the invention has been described above with reference to one or more preferred embodiments, it will be appreciated that various changes or modifications may be made without departing from the scope of the invention as defined in the appended claims.

I claimed:

1. A bracket for securing components to a surface of a structure with a radius of curvature, the bracket comprising;
    a center connecting member with first and second ends;
    at least two separate leg elements detachably secured to and extending outwardly and downwardly from the first and second ends of the connecting member and terminating at a distal end wherein a curvature of the distal end of the at least two leg elements is matched to a radius of curvature of the structure to which the bracket is to be secured;
    at least one hole in the center connecting member for securing a component to the bracket; and
    at least one magnetic pad secured to each distal end of the at least two leg elements, wherein due to the curvature of the at least two leg elements a surficial contact of each magnetic pad with the surface of the structure is maximized and the bracket has an aspect ratio of at least 10%.

2. The bracket of claim 1, wherein the at least two leg elements comprise a total of four legs.

3. The bracket of claim 1, wherein the magnetic pads comprise a magnet with a contact surface fitted into a socket.

4. The bracket of claim 1, wherein there is at least one hole in each of the at least two leg elements for securing components to the bracket.

5. The bracket of claim 1, wherein the components mounted to the bracket and secured to the structure are conduits and cables.

6. The bracket of claim 1, wherein the components are secured to the bracket using clamps.

7. A bracket for securing components to a surface of a structure, the bracket comprising;
    a center panel with first and second ends and a mid-line about which the center panel is symmetrically bent, the angle of the bend is in the range of from about 5 to 45 degrees relative to a flat center panel and the center panel includes at least one through hole;
    at least one leg element extending outwardly from each of the first and second ends of the center panel;
    a mounting member rotatably secured by a hinge to each of the at least one leg elements, wherein the mounting member is capable of a range of rotation about the at least one leg element of approximately 180 degrees; and
    at least one magnetic element detachably secured to the mounting member, wherein the magnetic element maintains contact with the surface of the structure.

8. A bracket for securing components to a surface of a structure, the bracket comprising;
    a channel member further comprising first and second longitudinally opposed ends, a floor and opposed side walls separated by the floor;
    at least one leg element outwardly extending from the channel member and detachably secured to the channel member floor and proximate to each of the first and second ends of the channel member, wherein an angle of departure of the at least one leg element extending outwardly from the channel member is determined by the surface of the structure; and
    at least one magnetic element detachably secured to each of the at least one leg elements, wherein the magnetic element maintains contact with the surface of the structure.

9. The bracket of claim 8, wherein the channel member side walls further comprise upper wall edges opposite a union of the opposed side walls with the channel floor.

10. The bracket of claim 8, wherein the upper wall edges are arcuately bent downward to facilitate engagement with clips for securing components to the bracket.

11. The bracket of claim 8, wherein the components are conduits and cables.

12. The bracket of claim 8, wherein the floor of the channel member has at least one through hole.

13. The bracket of claim 8, wherein the at least one leg element proximate to each of the first and second ends of the channel member is capable of being bent at an angle to increase contact between the at least one magnetic element, secured to each of the at least one leg elements, and the surface of the structure.

14. A system for securing at least one cable to a surface of a structure, the structure having a radius of curvature, the system comprising;
    first and second brackets separated by a distance, the first and second brackets comprising:
    a center connecting member with first and second ends;
    at least two separate leg elements detachably secured to and extending outwardly and downwardly from the first and second ends of the center connecting member and terminating at a distal end wherein a curvature of the distal end of the at least two leg elements is matched to the radius of curvature of the structure;
    at least one hole in the center connecting member for securing a component to the bracket; and
    at least one hole in the distal end of each of the at least two leg elements for securing the bracket to the structure, wherein due to alignment of the curvature of the distal end of the at least two legs with the curvature of the structure a surficial contact of the distal end of the at least two legs with the structure is maximized;
    at least one support rail with first and second ends wherein the support rail is curved to arc away from the structure and is secured through sockets attached to and underneath the center connecting member of the bracket, the first end of the support rail secured to the first bracket and the second end of the support rail secured to the second bracket; and
    a cable secured to the rail and the first and second brackets.

* * * * *